United States Patent
Hartmann

(10) Patent No.: US 9,676,331 B2
(45) Date of Patent: Jun. 13, 2017

(54) METHOD FOR DETERMINING A STATE OF A PAVEMENT FROM SURROUNDINGS SENSOR DATA

(71) Applicant: Continental Teves AG & Co. oHG, Frankfurt (DE)

(72) Inventor: Bernd Hartmann, Bad Homburg (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 293 days.

(21) Appl. No.: 14/424,148

(22) PCT Filed: Dec. 9, 2013

(86) PCT No.: PCT/DE2013/200339
§ 371 (c)(1),
(2) Date: Feb. 26, 2015

(87) PCT Pub. No.: WO2014/094766
PCT Pub. Date: Jun. 26, 2014

(65) Prior Publication Data
US 2015/0224925 A1     Aug. 13, 2015

(30) Foreign Application Priority Data
Dec. 20, 2012    (DE) .................. 10 2012 112 724

(51) Int. Cl.
*B60R 1/00*  (2006.01)
*H04N 7/18*  (2006.01)
(Continued)

(52) U.S. Cl.
CPC ............. *B60R 1/00* (2013.01); *B60W 40/068* (2013.01); *G06K 9/00791* (2013.01);
(Continued)

(58) Field of Classification Search
CPC . B60R 1/00; B60W 2420/42; B60W 2520/28; B60W 40/068; G06K 9/00791; H04N 7/183
(Continued)

(56) References Cited

U.S. PATENT DOCUMENTS 4,712,635 A    12/1987  Sumiya et al.
5,774,821 A    6/1998   Eckert
(Continued)

FOREIGN PATENT DOCUMENTS

DE    198 56 510    9/1999
DE    198 54 964    6/2000
(Continued)

OTHER PUBLICATIONS

Raqib Omer, "An Automatic Image Recognition System for Winter Road Surface Condition Monitoring", Master's Thesis, University of Waterloo, Ontario, Canada, Feb. 22, 2011, pp. i-xii, 1 to 68 retrieved at https://uwspace.uwaterloo.ca/handle/10012/5799.
(Continued)

*Primary Examiner* — Francis G Geroleo
(74) *Attorney, Agent, or Firm* — W. F. Fasse

(57) ABSTRACT

For determining a state of a pavement from surroundings sensor data, local data received from at least one device that measures a local pavement state or coefficient of friction is merged with camera image data received from a camera for imaging a pavement extending in front of the vehicle. When analyzing the camera image data, the local data representing the measured pavement state or coefficient of friction is assigned to individual image sectors of a camera image while taking odometric and time information into account to achieve proper correspondence, and the local data is taken into account for supporting and/or plausibility-checking of
(Continued)

an anticipatory estimation of the local coefficient of friction or pavement state based on the camera image data.

15 Claims, 2 Drawing Sheets

(51) Int. Cl.
    *G06K 9/00*           (2006.01)
    *B60W 40/068*      (2012.01)

(52) U.S. Cl.
    CPC ......... *H04N 7/183* (2013.01); *B60W 2420/42* (2013.01); *B60W 2520/28* (2013.01)

(58) Field of Classification Search
    USPC ........................................................ 348/148
    See application file for complete search history.

(56) References Cited

U.S. PATENT DOCUMENTS

| | | | |
|---|---|---|---|
| 5,963,148 | A | 10/1999 | Sekine et al. |
| 6,636,258 | B2 | 10/2003 | Strumolo |
| 6,807,473 | B1 | 10/2004 | Tran |
| 8,180,527 | B2 | 5/2012 | Mueller-Schneiders et al. |
| 8,306,747 | B1 | 11/2012 | Gagarin et al. |
| 8,310,545 | B2 * | 11/2012 | Fujita .................. G06T 7/00 340/435 |
| 8,957,949 | B2 | 2/2015 | Randler et al. |
| 2002/0007661 | A1 | 1/2002 | Takahashi |
| 2002/0072841 | A1 * | 6/2002 | Kogure ................ B60T 8/172 701/80 |
| 2002/0087251 | A1 * | 7/2002 | Kogure ................ B60T 8/172 701/80 |
| 2003/0101805 | A1 | 6/2003 | Raab |
| 2004/0016870 | A1 | 1/2004 | Pawlicki et al. |
| 2004/0138831 | A1 * | 7/2004 | Watanabe ............ B60T 8/1725 702/33 |
| 2005/0085987 | A1 | 4/2005 | Yokota et al. |
| 2005/0172526 | A1 * | 8/2005 | Taylor .................. G01B 11/22 37/466 |
| 2007/0050121 | A1 | 3/2007 | Ammon et al. |
| 2008/0027607 | A1 | 1/2008 | Ertl et al. |
| 2010/0253541 | A1 | 10/2010 | Seder et al. |
| 2011/0245995 | A1 | 10/2011 | Schwarz |
| 2012/0029783 | A1 | 2/2012 | Takenaka et al. |
| 2012/0078483 | A1 | 3/2012 | Yajima et al. |
| 2012/0167663 | A1 | 7/2012 | Groitzsch et al. |
| 2012/0323444 | A1 | 12/2012 | Rieger et al. |
| 2013/0332028 | A1 | 12/2013 | Heger et al. |
| 2013/0338878 | A1 * | 12/2013 | Fritz .................... B60W 10/18 701/41 |
| 2014/0005875 | A1 * | 1/2014 | Hartmann ................ G08G 1/16 701/23 |
| 2014/0052325 | A1 | 2/2014 | Naegele et al. |
| 2014/0347448 | A1 | 11/2014 | Hegemann et al. |
| 2015/0166072 | A1 | 6/2015 | Powers et al. |
| 2015/0251659 | A1 | 9/2015 | Fischer et al. |
| 2015/0344037 | A1 | 12/2015 | Siegel et al. |
| 2015/0371095 | A1 | 12/2015 | Hartmann et al. |
| 2016/0121902 | A1 | 5/2016 | Huntzicker et al. |
| 2016/0379065 | A1 | 12/2016 | Hartmann |

FOREIGN PATENT DOCUMENTS

| | | |
|---|---|---|
| DE | 101 55 488 | 5/2003 |
| DE | 102 56 726 | 6/2004 |
| DE | 102004018088 | 2/2005 |
| DE | 102004055069 | 2/2006 |
| DE | 102004047914 | 3/2006 |
| DE | 102004048637 | 4/2006 |
| DE | 102006012289 | 9/2007 |
| DE | 102008047750 | 5/2009 |
| DE | 102010013339 | 1/2011 |
| DE | 102009041566 | 3/2011 |
| DE | 102011100907 | 1/2012 |
| DE | 102010045162 | 3/2012 |
| DE | 102011081362 | 2/2013 |
| EP | 0 412 791 | 2/1991 |
| EP | 0 792 228 | 9/1997 |
| EP | 0 827 127 | 3/1998 |
| EP | 1 201 521 | 5/2002 |
| EP | 2 521 111 | 11/2012 |
| JP | 07-035522 A | 2/1995 |
| JP | 2005-226671 A | 8/2005 |
| KR | 1020110032422 | 3/2011 |
| WO | WO 2011/007015 | 1/2011 |
| WO | WO 2012/110030 | 8/2012 |
| WO | WO 2012/113385 | 8/2012 |
| WO | WO 2013/009697 | 1/2013 |

OTHER PUBLICATIONS

Maria Jokela et al., "Road Condition Monitoring System Based on a Stereo Camera", Intelligent Computer Communication and Processing, IEEE 5$^{th}$ International Conference ICCP 2009, Piscataway, NJ, USA, Aug. 27, 2009, XP031545069, pp. 423 to 428.

J. Chetan et al., "An Adaptive Outdoor Terrain Classification Methodology Using Monocular Camera", Intelligent Robots and Systems, IEEE International Conference IROS 2010, Piscataway, NJ, USA, Oct. 18, 2010, XP031920567, pp. 766 to 771.

J. H. Choi et al., "Road Identification in Monocular Color Images Using Random Forest and Color Correlogram", International Journal of Automotive Technology, vol. 13, No. 6, The Korean Society of Automotive Engineers, Heidelberg, Oct. 2, 2012, XP035120063, pp. 941 to 948.

Raquib Omer et al., "An Automatic Image Recognition System for Winter Road Surface Condition Classification", Intelligent Transportation Systems, 13$^{th}$ International IEEE Conference ITSC 2010, Piscataway, NJ, USA, Sep. 19, 2010, XP031792816, pp. 1375 to 1379.

T. Teshima et al., "Detection of the Wet Area of the Road Surface Based on a Saturated Reflection", Meeting on Image Recognition and Understanding, 2007, XP002730931, pp. 1218 to 1223, retrieved at http://hvrl.ics.keio.ac.jp/paper/pdf/domestic_Conference/2007/MIRU2007_teshima.pdf.

Ernst Dieter Dickmanns et al., "Dynamic Monocular Machine Vision", Machine Vision and Applications, 1988 Springer-Verlag New York Inc., pp. 223 to 240.

International Search Report of the International Searching Authority for International Application PCT/DE2013/200339, mailed Apr. 29, 2014, 2 pages, European Patent Office, HV Rijswijk, Netherlands.

PCT International Preliminary Report on Patentability including English Translation of PCT Written Opinion of the International Searching Authority for International Application PCT/DE2013/200339, issued Jun. 23, 2015, 10 pages, International Bureau of WIPO, Geneva, Switzerland.

German Search Report for German Patent Application No. 10 2012 112 724.7, dated Sep. 30, 2013, 5 pages, Muenchen, Germany, with English translation, 5 pages.

* cited by examiner

METHOD FOR DETERMINING A STATE OF A PAVEMENT FROM SURROUNDINGS SENSOR DATA

FIELD OF THE INVENTION

The invention relates to a method and a device for determining a state of a pavement from surroundings sensor data, particularly from camera data.

BACKGROUND INFORMATION

The detection or determination of the coefficient of friction being effective between the tire and the pavement or the detection of the state of the pavement (e.g., dry, wet, snow-covered and icy), from which state of the pavement the coefficient-of-friction group can be derived, is an important prerequisite for assisting the driver with his or her driving task and thus for avoiding serious accidents or lessening the consequences thereof. In general, the assessment of road conditions resides with the driver, who adapts his or her driving behavior to said road conditions. Vehicle control systems, such as ESC (Electronic Stability Control)/ TCS (Traction Control System) or ABS (Anti-lock Braking System), assist the driver in stabilizing the vehicle in the limit range so that the driver can perform his or her driving task in extreme situations more easily.

With an increasing degree of driver assistance automation through to highly automated or autonomous driving, the importance of information on the state of the pavement or on the coefficient of friction is increasing continuously. The information on the state of the pavement or on the coefficient of friction is typically used to inform the driver warn the driver fix the instants of intervening in the braking system and the steering gear with driver assistance systems and adjust vehicle control functions (e.g., brake, steering gear).

In driver assistance systems, the avoidance of accidents is getting more and more important. Emergency braking systems (and the recently introduced emergency steering systems) make an important contribution thereto. However, the effect of such systems decisively depends on the coefficient of friction of the ground. Moisture, snow and ice considerably reduce the coefficient of friction available between the tire and the pavement as against the coefficient of friction available on a dry pavement.

EP 792 228 B1 shows a system for driving stability control for ESP (Electronic Stability Program)/ESC control systems, by means of which system a coefficient of friction can be determined in special situations. When at least one wheel utilizes the coefficient of friction (e.g., when driving on slippery ground), the vehicle brake control system can determine the coefficient of friction from the rotation behavior of the wheels and from the ESP/ESC acceleration sensors.

DE 102 56 726 A1 shows a method for generating a signal depending on the condition of the pavement using a reflection signal sensor, e.g., a radar sensor or an optical sensor, thereby making an anticipatory detection of the state of the pavement in a motor vehicle possible.

DE 10 2004 018 088 A1 shows a pavement detection system with a temperature sensor, an ultrasonic sensor and a camera. The pavement data received from the sensors are filtered and compared with reference data in order to determine the practicability of the pavement, wherein the pavement surface (e.g., concrete, asphalt, dirt, grass, sand, or gravel) and the state thereof (e.g., dry, icy, snow-covered, wet) can be classified.

DE 10 2004 047 914 A1 shows a method for assessing the state of the pavement, in which data received from several different sensors (e.g., camera, infrared sensor, rain sensor, or microphone) are merged in order to reach a state-of-pavement classification which a coefficient of friction can be assigned to.

DE 10 2008 047 750 A1 shows a determination of an adhesion coefficient with few sensors, in which torsional oscillations of a wheel of a vehicle are analyzed and a coefficient of friction is estimated on the basis of this analysis.

DE 10 2009 041 566 A1 shows a method for determining a pavement coefficient of friction $\mu$, in which a first coefficient-of-friction parameter, which is constantly updated, and a second coefficient-of-friction parameter, which is updated situationally only, are combined with each other in order to obtain a common estimated friction value.

WO 2011/007015 A1 shows a laser-based method for coefficient-of-friction classification in motor vehicles. To this end, signals of a lidar sensor/CV sensor directed toward the pavement surface are analyzed. After that, a coefficient of friction is assigned, particularly on the basis of the amplitude of the measured pavement surface. For example, one can estimate whether snow, asphalt or ice form the pavement surface.

WO 2012/110030 A2 shows a method and a device for coefficient-of-friction estimation by means of a 3D camera, e.g., a stereo camera. At least one image of the surroundings of the vehicle is acquired by means of the 3D camera. From the image data of the 3D camera, a height profile of the road surface is created in the entire area extending in front of the vehicle. The expectable local coefficient of friction of the road surface in the area extending in front of the vehicle is estimated from the height profile.

The automatic acquisition of the state-of-pavement information is a key element on the way to the realization of autonomous driving in future.

However, the known methods are disadvantageous. On the one hand, the availability of information is highly limited (ESC). On the other hand, the sensors and algorithms are not sufficiently precise yet (camera, IR sensors, radar) or the robustness of the system is highly insufficient for safety systems (analysis of torsional oscillations of wheel, stereo camera).

The approach of the inventive solution consists in the following considerations: The coefficient-of-friction information determined according to the state of the art is usually not valid for every pavement segment.

Directly measuring systems are capable of measuring very precisely, but they are not capable of operating in an anticipatory manner. Typical examples of such systems are vehicle control systems, such as ESC, ABS or TCS, which virtually determine the coefficient of friction directly in the footprint of the tire on the basis of the slipping and running-in behavior on the tire. Technology-specifically, optical sensors (e.g., near infrared) also have a very limited capability to deliver information in a sufficiently anticipatory manner since the angle relative to the pavement must not become too acute. Both systems and also wheel speed analysis are only capable of determining the state of the pavement locally.

Other systems, particularly camera/video systems, are only capable of determining the state of the pavement indirectly (e.g., by means of classification) and are therefore less precise than directly measuring systems for process-related reasons. However, systems having a coverage depth of some/several meters (e.g., 1 m-20 m, 2 m-100 m, 5 m-200 m depending on the design of the camera) and having a width that is sufficient for pavement surface detection are particularly well suited for an extensive detection of the pavement extending in front of the vehicle due to their actual application as surroundings sensors or front cameras.

SUMMARY OF THE INVENTION

An inventive method for determining a state of a pavement from surroundings sensor data provides a merger of data received from at least one device (sensor) that measures a local coefficient of friction or determines state-of-pavement information on the vehicle and/or particularly on or directly in front of at least one vehicle wheel/tire with data received from a camera or from a larger-range vehicle surroundings sensor that covers the pavement extending in front of the vehicle. To this end, when analyzing the camera image data, the locally measured pavement state or coefficient of friction or the local state-of-pavement information may be assigned to individual image sectors of a camera image whilst taking odometric and time information into account and taken into account for the support and/or plausibilization of an anticipatory and locally resolved coefficient-of-friction estimation or state-of-pavement determination on the basis of camera data.

In this connection, odometric information is information that characterizes a motion of the vehicle and particularly comprises vehicle sensor system data, such as measured quantities of a chassis, of a power train, of a steering gear, as well as measured quantities of a navigation device of the vehicle. Thus, a performed motion or trajectory of the vehicle can be determined whilst taking the time information into account, or a future trajectory can be predicted in combination with the surroundings sensor system.

In particular, while the vehicle is in motion, a limited pavement segment that at first is only covered by the camera and whose pavement state or coefficient of friction is estimated from camera images can be measured afterwards when the locally measuring sensor is moving over it. On the basis of this measured coefficient of friction or this determined state-of-pavement information, pavement segments extending in front of the vehicle can now be assessed, the image analysis for said pavement segments extending in front of the vehicle leading to similar or identical results as the image analysis for the original limited pavement segment (in previous camera images).

The coefficient of friction, also called adhesion coefficient or coefficient of static friction, indicates what force can be maximally transmitted between a pavement surface and a vehicle tire (e.g., in the tangential direction). Thus, said coefficient is an essential measure of the state of the pavement. Aside from the state of the pavement, properties of the tire must be taken into account in order to be able to determine the coefficient of friction completely. Typically, only state-of-pavement information is taken into account for an estimation of the coefficient of friction (e.g., from camera image data) since it is generally impossible to determine any tire properties from camera image data.

In other words, systems locally determining the coefficient of friction or the state of the pavement (such as ESC including ABS/TCS) or an analysis of the torsional oscillations of the wheel (both on the basis of the wheel speed signal) and/or optical sensors (e.g., infrared/laser sensors) for determining the pavement surface or measuring the local coefficient of friction are merged with the camera/video sensor system for the extensive detection of the pavement extending in front of the vehicle such that the discrete measuring points of the locally measuring device can be tracked on the basis of odometric and time information (e.g., on the basis of the vehicle motion in the camera image) and can thus be easily assigned to the individual image sectors (pavement segments) for the purpose of the support and plausibilization of the camera algorithms.

The inventive method for determining the state of the pavement ensures a very precise, high-resolution and, above all, anticipatory determination of the locally resolved pavement state or coefficient of friction. As against predetermined classification methods of a state-of-pavement/coefficient-of-friction estimation from camera image data alone, the inventive method has proven to be particularly adaptable since the actually measured local coefficients of friction or determined local pavement information make—due to the assignment to the current camera image data—the method largely resistant to disturbances that might occur when the camera covers the pavement, whereby the safety systems of the vehicle can be prepared for pavement states predictively and situationally or the driver can be informed/warned.

In an advantageous embodiment, image analysis includes an assignment of a locally measured coefficient of friction to a pavement segment in at least one camera image if the consideration of odometric and time information reveals that the pavement state/coefficient of friction of this pavement segment has been locally measured afterwards. In particular, a pavement segment can be determined from the camera image by segmentation, wherein segmentation preferably delivers segments having comparable pavement states. One can determine from the odometric and time information which pavement segment from a camera image was driven over afterwards and what local coefficient of friction was measured in doing so or what local pavement state was determined in doing so.

Preferably, image analysis provides a classification of individual pavement segments in camera images on the basis of particular features. In particular, said particular features may be assigned to predetermined states of the pavement. The determined state of the pavement (e.g., dry, wet, snow-covered, icy) is an indicator of the coefficient of friction available between the tire and the pavement. A class of pavement segments (in which the same state of the pavement was determined from the camera image) can now be assigned to a coefficient of friction locally measured afterwards or a pavement state locally determined afterwards, whereby an anticipatory coefficient-of-friction estimation for all pavement segments assigned to this class can be performed successfully.

According to an advantageous embodiment, the camera image is subdivided into a two-dimensional grid in the plane of the pavement and the at least one measured local coefficient of friction or pavement state is assigned to at least one cell of the grid.

To this end, a representation of the pavement surface imaged by the camera may be created, said representation showing the distances on the pavement surface true to scale (e.g., a bird's eye view), wherein the distances between all grid lines of the grid would be fixed in a horizontal direction or a vertical direction.

Alternatively, a grid could be superimposed on the camera image, said grid reflecting the perspective distortion of the surroundings of the vehicle (and of the pavement) by the camera, whereby the contents of each grid cell could correspond to an equally sized pavement segment with real distances.

Preferably, the number of the cells of the grid is determined by the homogeneity of the pavement or pavement surface, particularly in the camera image. If the camera image shows a largely homogeneous pavement surface, one can use a smaller number of grid cells than with an inhomogeneous pavement surface. Different pavement surface materials, puddles, snow-covered surfaces and leaves may cause inhomogeneous pavement surfaces, on which the state of the pavement, and thus the coefficient of friction, may change very quickly.

Advantageously, the number of the cells of the grid is determined by the current driving situation and/or the criticality thereof. In critical driving situations, a larger number of cells may be used to make the locally resolved state-of-pavement/coefficient-of-friction estimation from the camera image even more precise, whereby, for example, the control of the brakes for an emergency braking maneuver can be optimized whilst taking local state-of-pavement/coefficient-of-friction changes into account.

Furthermore, the number of the cells of the grid may be determined by the computing power available for image analysis.

Possibly, the number of cells may be reduced to 1. As a rule, however, a plurality of cells is to be provided for the grid in order to make local resolution possible.

According to a preferred embodiment, the result of the analysis of the camera data is predictively applied afterwards, whilst taking the measured state-of-pavement/coefficient-of-friction data assigned to the camera image into account, to a subsequently acquired camera image. Said assignment is preferably performed on the basis of cells having the same or similar features with respect to the state of the pavement, wherein, in particular, a pavement state/coefficient of friction confirmed or made plausible on the basis of a locally measured coefficient of friction or a locally determined pavement state may be assigned to individual cells belonging to a common class.

Advantageously, a vehicle corridor is calculated from a predicted movement trajectory of the vehicle, by means of which vehicle corridor the positions of the individual locally measuring sensors and of the vehicle wheels can be predictively assigned to pavement segments extending in front of the vehicle in the camera image (i.e., in particular, to individual cells of a grid). The movement trajectories of the vehicle can be predicted from vehicle sensor data and/or from surroundings sensor data (camera, radar, lidar, etc.) in a manner known per se.

Advantageously, a class probability is assigned to individual pavement segments or grid cells. For example, one may indicate that a particular cell is to be assigned to class 1 at 80% and to another class at 20%, whereby the fact that there may actually be sectors representing varying conditions within one cell can be taken into account. For example, 60% of a contents of a cell may represent a wet pavement and 40% may represent a dry pavement.

Preferably, a monocular camera is used as a camera sensor. Mono cameras are well-established driver assistance cameras and cheaper than stereo cameras.

According to an advantageous embodiment, a stereo camera is used as a camera sensor. As against a mono camera, a stereo camera resolves the image data spatially. Depending on the respective requirements, both images or only one of the two images may be analyzed for state-of-pavement/coefficient-of-friction estimation.

In a preferred realization, an optical sensor is used, exclusively or in addition to other sensors, as a locally measuring device/sensor. The optical sensor is preferably directed toward the pavement surface and can locally determine the three-dimensional shape of the pavement surface, wherefrom the state of the pavement can be derived or a coefficient of friction can be estimated.

Alternatively, ultrasonic or radar sensors may be used as such local measuring devices as long as they are capable of locally determining the three-dimensional shape of the pavement surface.

In a particularly advantageous embodiment, at least one measuring device measuring and/or deriving coefficients of friction from the speed signals of a vehicle wheel (R1-R4) is used, exclusively or in addition to other devices, as a locally measuring device. The slip of the tire and the oscillations of the tire can be analyzed from the wheel speed signal and the coefficient of friction can be classified on the basis thereof. For example, DE 10 2008 047 750 A1 shows such an analysis of the oscillation behavior of the tire, from which behavior a spectrum of stimulation by the pavement is determined, said spectrum correlating with the coefficient of friction.

ABS/ESC/TCS systems being capable of measuring or deriving maximum coefficients of friction from the speed signals of individual vehicle wheels by an analysis of periods of increasing slip may also be used as such measuring devices.

The invention also relates to a device for determining a state of a pavement. The device comprises a camera, at least one device designed to measure a local coefficient of friction or to determine a local pavement state, and a camera data analysis device. The latter is designed to take the locally measured coefficient of friction/state of the pavement into account during camera data analysis. The camera data analysis device is designed to assign the locally measured coefficient of friction/state of the pavement to individual image sectors of a camera image whilst taking odometric and time information into account and to be capable of taking the locally measured coefficient of friction/state of the pavement into account for the support and/or plausibilization of an anticipatory and locally resolved coefficient-of-friction estimation or state-of-pavement determination on the basis of camera data.

BRIEF DESCRIPTION OF THE DRAWINGS

In the following, the invention will be explained in greater detail on the basis of figures and exemplary embodiments, in which.

DETAILED DESCRIPTION OF EXAMPLE EMBODIMENTS OF THE INVENTION

Figure 1:
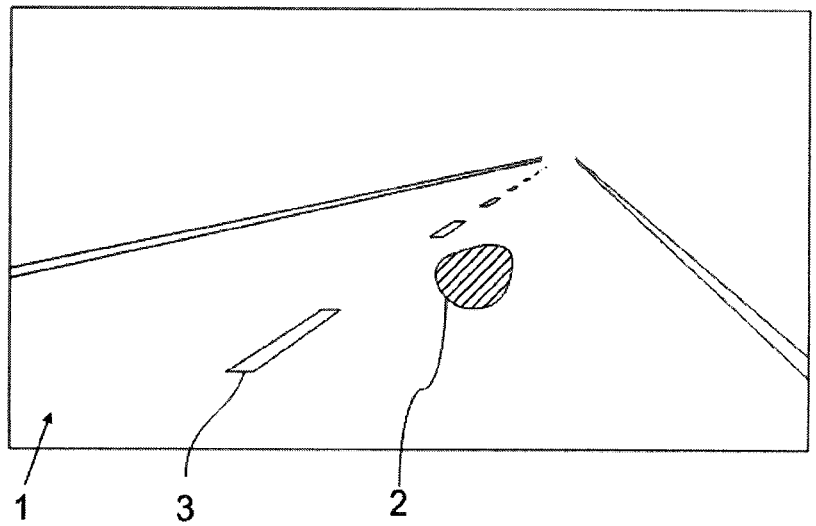
FIG. 1 shows a camera image of a region of the surroundings of the vehicle extending in front of the vehicle.

FIG. 1 shows, by way of example, a camera image of a region of the surroundings of the vehicle extending in front of the vehicle, which image was acquired by a front camera of a moving vehicle. Camera-based driver assistance functions can be realized on the basis of the same image, e.g., Lane Departure Warning (LDW), Lane Keeping Assistance/System (LKA/LKS), Traffic Sign Recognition (TSR), Intelligent Headlamp Control (THC), Forward Collision Warning (FCW), Precipitation Detection, Adaptive Cruise Control (ACC), Park Assist, Emergency Brake Assist (EBA), or Emergency Steering Assist (ESA).

The camera image shows a pavement (1) with a largely homogeneous surface. One can see lane markings on the surface: A continuous side line marking the left end of the pavement and a continuous side line marking the right end of the pavement as well as center line segments (3) of the broken/dashed central pavement marking. The pavement (1) could be an asphalt or concrete pavement. One can see a puddle (2) on the pavement (1).

Figure 2:
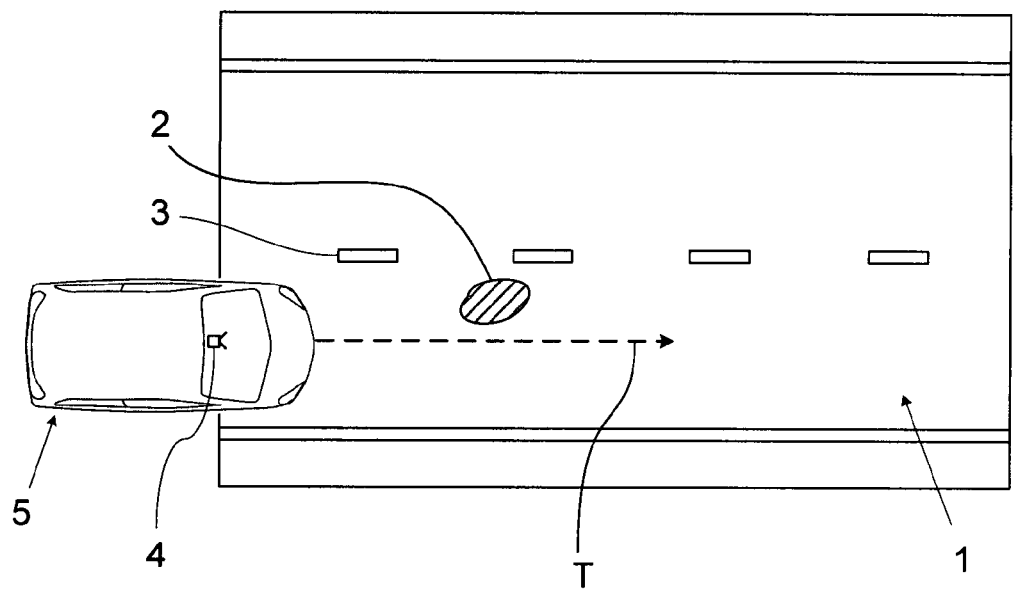
FIG. 2 shows a bird's eye view representation of the scene shown in the camera image.

FIG. 2 shows a bird's eye view representation of the scene shown in the camera image in FIG. 1. This representation can be determined from the camera image, wherein, if a mono camera is used, imaging properties of the camera (4), the installation geometry of the camera in the vehicle (5), the actual height of the vehicle (due to tire position control/chassis control), the pitch angle, the yaw angle and/or the roll angle are preferably taken into account. One can assume that the pavement surface is even.

If a stereo camera is used, the representation can be directly determined due to the acquired 3D image data, wherein further aspects may be taken into account in this case as well.

The representation is essentially characterized by the fact that distances shown in the representation correspond to real distances, i.e., the median strip segments shown are arranged equidistantly on the real pavement as well.

The representation in FIG. 2 shows the pavement (1), the puddle (2) and the center line segments (3) of the pavement marking, which are already included in the camera image (FIG. 1). The representation additionally includes a vehicle (5) with a camera (4), wherein the image in FIG. 1 was acquired by means of the camera (4). The dashed arrow indicates the predicted trajectory (T) of the vehicle (5). For this straight-ahead motion, the distance traveled s along the trajectory (T) in the case of a uniform motion with a velocity v can be determined from s=vt whilst taking the information about time t into account. In this manner, one can determine, whilst taking the odometric and time information into account, when, e.g., the left front wheel of the vehicle (5) will reach the puddle (2).

This representation does not show the local coefficient-of-friction measuring devices of the vehicle (5) that are capable of measuring the pavement state and/or the coefficient of friction between the tire and the pavement surface (1) locally (i.e., essentially below the vehicle). Such devices may be optical sensors (6) directed toward the pavement surface (1) (infrared or laser sensors in particular) or devices such as ESC that determine the available coefficient of friction locally on the wheels or that derive a coefficient of friction from an analysis of a wheel speed signal.

Figure 3:
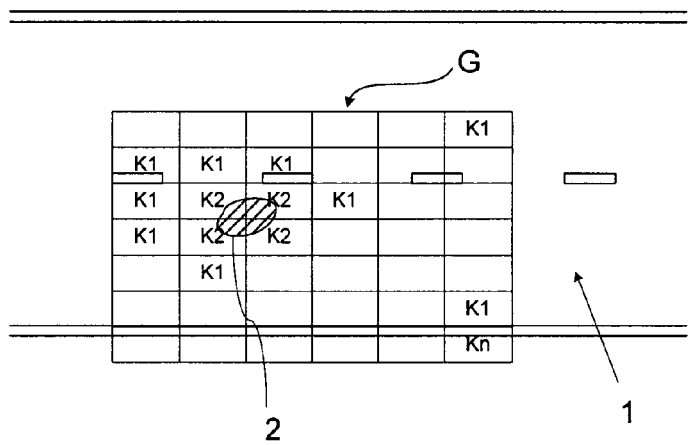
FIG. 3 shows a subdivision of a part of the representation into cells by means of a grid, in which individual cells are classified.

FIG. 3 shows how a grid (G) is superimposed on a part of the representation in FIG. 2, whereby the representation is subdivided into individual cells. By means of classification, individual classes containing a piece of information about the pavement state or the coefficient of friction may be assigned to individual grid cells. In the present example, those cells in which the pavement is a dry asphalt pavement are assigned to class K1. Those cells in which wet asphalt is present are assigned to class K2. Cells in which a different type of ground is present may be assigned to class Kn.

For example, a simple classification consists in a subdivision of the pavement segments into four classes: dry asphalt (K1), wet asphalt (K2), snow, and ice. More generally, n classes K1 to Kn may be provided that may take, e.g., various pavement materials (asphalt, concrete, sand, gravel, etc.) and various condensate states (e.g., dry, wet, snow, ice) into account. Among the n classes one may also provide a remaining class for pavement segments that cannot be assigned to any of the other (predetermined) classes.

The number of the grid cells or the size of an individual cell of the grid (G) may be varied. If the camera image shows a largely homogeneous pavement surface (such as the pavement (1) except for the puddle (2) in the present case), one can use a smaller number of grid cells than with a pavement surface that is inhomogeneous on the whole or than in the region of the puddle (2). Different pavement surface materials, puddles (2), snow-covered surfaces and leaves may cause inhomogeneous pavement surfaces, on which the coefficient of friction may change very quickly.

In critical driving situations, a larger number of cells may also be used to make the locally resolved state-of-pavement/coefficient-of-friction estimation from the camera image even more precise, whereby, for example, the control of the brakes for an emergency braking maneuver can be optimized whilst taking local coefficient-of-friction changes into account. Finally, the number of the cells of the grid (G) may be determined by the computing power available for image analysis.

Figure 4:
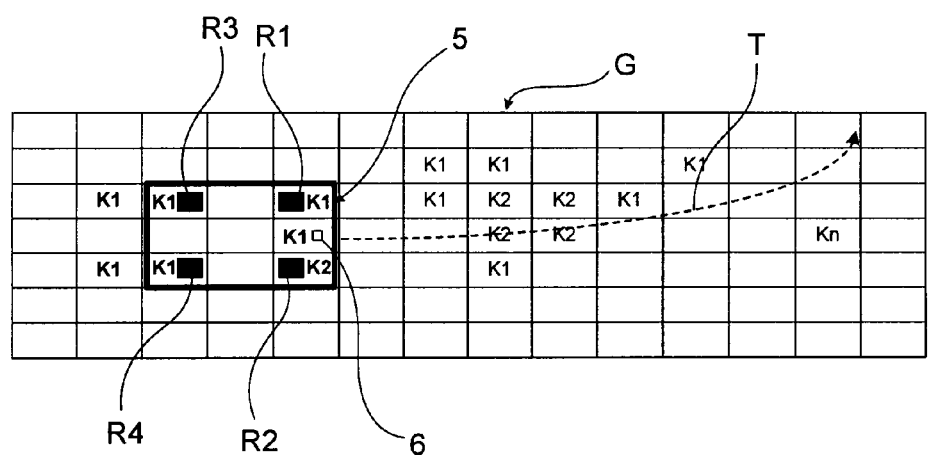
FIG. 4 shows a vehicle with locally measuring sensors in a grid, in which individual cells are classified.

FIG. 4 shows a grid-based assignment of local measured coefficient-of-friction data to classified pavement segments or grid cells.

As explained on the basis of FIG. 3, the individual cells are first classified on the basis of particular features by image analysis by means of image-processing algorithms, wherefrom class values (K1 to Kn) for the cells located in front of the vehicle result.

For example, FIG. 4 shows a pavement situation comparable to the pavement situation shown in FIG. 2 and FIG. 3. Most cells are assigned to class K1, whereas a 2×2 block of cells is assigned to class K2. The information that there is a puddle or a coherent wet area (2) (on an otherwise dry pavement (1)) in front of the vehicle can be inferred from camera analysis and classification, but it is impossible to assign an actual pavement state/coefficient of friction to these classes (K1, K2, . . . ) if no further knowledge (average values, empirical values, etc.) is available. The material of the dry pavement (1) could be asphalt with good grip or smooth asphalt. The puddle (2) could be shallow or deep, could be a water or oil puddle, etc.

This uncertainty can be eliminated by measuring the pavement state/coefficient of friction by means of a local sensor of the vehicle (5). The vehicle (5) shown has an optical sensor (6) and four measuring devices that derive/measure, as local sensors, coefficients of friction from the speed signals of one of the four vehicle wheels (R1-R4) at a time. These local sensors measure a current pavement state/coefficient of friction that in each case can be assigned to that cell of the grid (G) within which the local sensor measures the pavement state/coefficient of friction. In FIG. 4, said cells are those cells in which the optical sensor (6) measures and in which one wheel (R1-R4) at a time is in contact with the pavement (1).

Classes K1 to Kn and the local measured values are combined with each other on the basis of odometric and time data.

The subdivision into classes on the basis of the camera data can now be merged, on the basis of odometry when the vehicle is driving over, with the results of the local sensors with the results of camera classification in the respective cells. In FIG. 4, for example, that cell in which the optical sensor (6) measures the pavement state/coefficient of friction was assigned to class K1 (dry asphalt). On the basis of the measured value, a coefficient of friction or a state of the pavement can be assigned to this class for the first time or a pre-estimated pavement state/coefficient of friction for this class (K1) can be made plausible, corrected or validated as a merged pavement state/coefficient of friction (K1). In the cells on the left (left rear wheel (R3) and right rear wheel (R4)), a corresponding merged coefficient of friction or state of the pavement (K1) was already determined when the vehicle was driving over.

Similarly, a measured value for class K2 (wet asphalt) can be obtained in that cell in which the right front wheel (R2) of the vehicle is located. To this end, the measuring device derives/measures the pavement state/coefficient of friction from the speed signal of the right front wheel (R2) of the vehicle and a merged coefficient of friction/state of the pavement (K2) for class K2 is determined therefrom. This cell was already assigned to class K2 in a previously acquired camera image, and it is determined, on the basis of the odometric and time data, if and when the local sensors measure in the region of these classified cells.

Afterwards, the merger results obtained in this manner are predictively applied to the currently anticipatory camera image and assigned to the corresponding classes of the individual cells in said camera image.

Alternatively, the future vehicle corridor can be calculated from the predicted movement trajectory (T) of the vehicle (5). This is also shown in FIG. 4. For example, one can estimate on the basis of the current camera image that the optical sensor (6) will be able to measure the pavement state/coefficient of friction in those cells through which the dashed trajectory (T) extends, and the point in time thereof can be estimated from the odometric and time data. In the case of a uniform motion with a constant angular velocity u along a circuit having a radius r, the distance s traveled during a period of time t is determined from $s=r\omega t$. Thus, the positions of the optical sensor (6) and of the individual wheels (R1-R4) of the vehicle (5) can be predictively and precisely assigned to the cells in front of the vehicle with their features. One can see, for example, that the optical sensor (6) will soon be able to measure the pavement state/coefficient of friction in two cells assigned to class K2 and that a merged coefficient of friction (K2) for class 2 will thus be available in the third cell and in the fourth cell to the right of the cell with the optical sensor (6).

LIST OF REFERENCE NUMERALS 1 pavement/pavement surface
2 puddle
3 center line segment
4 camera
5 vehicle
6 optical sensor for local pavement state determination
T (movement) trajectory
G grid
K1 class 1
K2 class 2
Kn class n
K1 merged coefficient-of-friction estimation for class 1
K2 merged coefficient-of-friction estimation for class 2
R1 left front wheel
R2 right front wheel
R3 left rear wheel
R4 right rear wheel

The invention claimed is:

1. A method of determining a state of a pavement on which a vehicle is driving, comprising
  merging locally measured data received from at least one locally measuring device that measures a local pavement state or coefficient of friction of the pavement, with camera data of a camera image received from a camera, and
  performing an image analysis comprising analyzing the camera data, which involves:
  sub-dividing the camera image into a two-dimensional grid of grid cells representing image sectors of the camera image in a plane of the pavement,
  assigning the locally measured data representing the local pavement state or coefficient of friction respectively to individual ones of the image sectors of the camera image in the camera data while taking odometric information of the vehicle and time information into account, and
  taking the locally measured data representing the local pavement state or coefficient of friction into account for support and/or plausibilization of an anticipatory and locally resolved coefficient-of-friction estimation or state-of-pavement determination based on the camera data.

2. The method according to claim 1, wherein the image analysis includes assigning the locally measured data representing the local pavement state or coefficient of friction to at least one pavement segment respectively represented in at least one of the image sectors in the camera image when the odometric information and the time information reveal that the locally measured data has been measured respectively at the at least one pavement segment.

3. The method according to claim 1, wherein the image analysis provides a classification of the individual image sectors in the camera image based on particular features of pavement segments depicted in the image sectors.

4. The method according to claim 1, wherein a total number of the grid cells of the grid is determined dependent on a homogeneity of the pavement.

5. The method according to claim 1, wherein a total number of the grid cells of the grid is determined dependent on a current driving situation and/or a criticality thereof.

6. The method according to claim 1, wherein a total number of the grid cells of the grid is determined dependent on an available computing power for performing the method.

7. The method according to claim 1, wherein a result of the image analysis of the camera data is predictively applied afterwards, whilst taking the local pavement state or coefficient of friction assigned to the camera image into account, to a subsequently acquired camera image.

8. The method according to claim 1, further comprising calculating a vehicle corridor from a predicted movement trajectory of the vehicle, by which vehicle corridor, positions of the at least one locally measuring device comprising individual wheels of the vehicle and/or at least one locally measuring sensor are predictively assigned to pavement segments respectively represented in the image sectors of the camera image, said pavement segments extending in front of the vehicle.

9. The method according to claim 1, further comprising assigning probability values to a respective one of the image sectors or a respective pavement segment represented in the respective image sector, said probability values indicating with what probability the respective image sector or the respective pavement segment is to be assigned to a first class and to at least a second class.

10. The method according to claim 1, wherein a mono camera is used as the camera.

11. The method according to claim 1, wherein a stereo camera is used as the camera.

12. The method according to claim 1, wherein a radar sensor, an ultrasonic sensor or an optical sensor is used as the locally measuring device, which is configured for locally determining a three-dimensional shape of a pavement surface of the pavement.

13. The method according to claim 1, wherein at least one measuring device that measures and/or derives a local coefficient of friction from speed signals of a vehicle wheel is used as the locally measuring device.

14. A device for determining a state of a pavement on which a vehicle is driving, comprising a camera that provides camera data of a camera image, at least one locally measuring device configured to measure a local pavement state or coefficient of friction of the pavement and to provide corresponding locally measured data, a merger device configured to merge the locally measured data with the camera data, and an image analysis device configured to perform an image analysis comprising analyzing the camera data, wherein, the image analysis device is further configured to sub-divide the camera image into a two-dimensional grid of grid cells representing image sectors of the camera image in a plane of the pavement, and to assign the locally measured data representing the local pavement state or coefficient of friction respectively to individual ones of the image sectors of the camera image in the camera data while taking odometric information of the vehicle and time information into account, and to take the locally measured data representing the local pavement state or coefficient of friction into account for support and/or plausibilization of an anticipatory and locally resolved coefficient-of-friction estimation or state-of-pavement determination based on the camera data.

15. A method of determining a surface condition of a driving surface on which a vehicle is driving, comprising steps:
   a) with a camera on said vehicle, producing camera data including a camera image of a selected surface area of said driving surface ahead in front of said vehicle;
   b) performing an image analysis and classification of said selected surface area in said camera image to determine, among predetermined classes, an estimated class of a surface condition comprising an estimated pavement state or an estimated coefficient of friction of said selected surface area;
   c) driving said vehicle forward whereby said selected surface area comes into a sensing range of a locally measuring sensor on said vehicle, and using time information and odometric information of said vehicle to achieve sensing registration of said locally measuring sensor with said selected surface area;
   d) with said locally measuring sensor, sensing locally measured data representing an actual surface condition comprising an actual pavement state or an actual coefficient of friction of said selected surface area;
   e) merging said locally measured data representing said actual surface condition with said estimated class of said surface condition for said selected surface area, and thereby assigning a new value of said actual surface condition to said estimated class of said surface condition, or validating, plausibilizing or correcting a previously assigned value of said actual surface condition that had previously been assigned to said estimated class of said surface condition; and
   f) repeating said steps a) to e), with regard to a subsequent selected surface area of said driving surface ahead in front of said vehicle.

* * * * *